(12) United States Patent
Shi et al.

(10) Patent No.: US 7,408,768 B2
(45) Date of Patent: Aug. 5, 2008

(54) MOUNTING APPARATUS FOR DATA STORAGE DEVICE

(75) Inventors: Zheng Shi, Shenzhen (CN); Jie Zhang, Shenzhen (CN); Chien-Li Tsai, Tucheng (TW)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 222 days.

(21) Appl. No.: 11/344,463

(22) Filed: Jan. 30, 2006

(65) Prior Publication Data

US 2007/0053148 A1 Mar. 8, 2007

(30) Foreign Application Priority Data

Sep. 5, 2005 (CN) .................. 2005 1 0037130

(51) Int. Cl.
*G06F 1/16* (2006.01)
(52) U.S. Cl. ...................................... 361/684
(58) Field of Classification Search ......... 361/679–687, 361/724–727; 292/163, 300, 302; 248/229.14, 248/316.4; 312/223.1, 223.2, 223.3; 211/26; 439/152–160
See application file for complete search history.

(56) References Cited

U.S. PATENT DOCUMENTS

| | | | |
|---|---|---|---|
| 5,305,180 A * | 4/1994 | Mitchell et al. | 361/685 |
| 5,764,477 A | 6/1998 | Ohgami et al. | |
| 6,785,141 B2 * | 8/2004 | Fang | 361/727 |
| 7,145,778 B2 * | 12/2006 | DeLuga et al. | 361/725 |

* cited by examiner

*Primary Examiner*—Lisa Lea-Edmonds
*Assistant Examiner*—Nidhi Desai
(74) *Attorney, Agent, or Firm*—Morris Manning Martin LLP; Tim Tingkang Xia, Esq.

(57) ABSTRACT

A mounting apparatus is provided for mounting a data storage device in a computer enclosure. The data storage device is mounted with a locking member. The mounting apparatus includes a restricting portion arranged in the computer enclosure, a locking portion movably disposed in the restricting portion, a resilient element disposed between the locking portion and the restricting portion, and a resilient pushing portion disposed between the data storage device and the restricting portion. The locking member drives the locking portion to deform the resilient element, and then engages with the locking portion. When the locking member disengages from the locking portion, the resilient pushing portion drives the data storage device outwardly.

13 Claims, 4 Drawing Sheets

MOUNTING APPARATUS FOR DATA STORAGE DEVICE

BACKGROUND OF THE INVENTION

1. Field of the Invention

The present invention relates to mounting apparatuses for data storage devices, and particularly to a mounting apparatus for readily attaching a data storage device to a notebook computer enclosure.

2. General Background

The production of notebook computer has became mature and entered a meager profit era. Only cost down and bringing convenience to users can bring more competitive strength. Typically, data storage devices, such as hard disk drives (HDDs), and compact disk-read only memory (CD-ROM) drives, are attached to a bottom panel of a notebook computer enclosure. However, fixing a data storage device with bolts is unduly laborious and time-consuming. The bolts after being unscrewed are very inconvenient to be stored, and are prone to be lost. Furthermore, because the interior space of the notebook computer enclosure is very limited, some elements besides the data storage device must be detached in order to achieve operating space for carrying out the fixing operation.

What is needed is a mounting apparatus for readily attaching or detaching a data storage device to or from a computer enclosure.

SUMMARY

An exemplary mounting apparatus is provided for mounting a data storage device in a computer enclosure. The data storage device is mounted with a locking member. The mounting apparatus includes a restricting portion arranged in the computer enclosure, a locking portion movably disposed in the restricting portion, a resilient element disposed between the locking portion and the restricting portion, and a resilient pushing portion disposed between the data storage device and the restricting portion. The locking member drives the locking portion to deform the resilient element, and then engages with the locking portion. When the locking member disengages from the locking portion, the resilient pushing portion drives the data storage device outwardly.

Other advantages and novel features will become more apparent from the following detailed description when taken in conjunction with the accompanying drawings, in which:

DETAILED DESCRIPTION OF THE EMBODIMENTS

Figure 1:
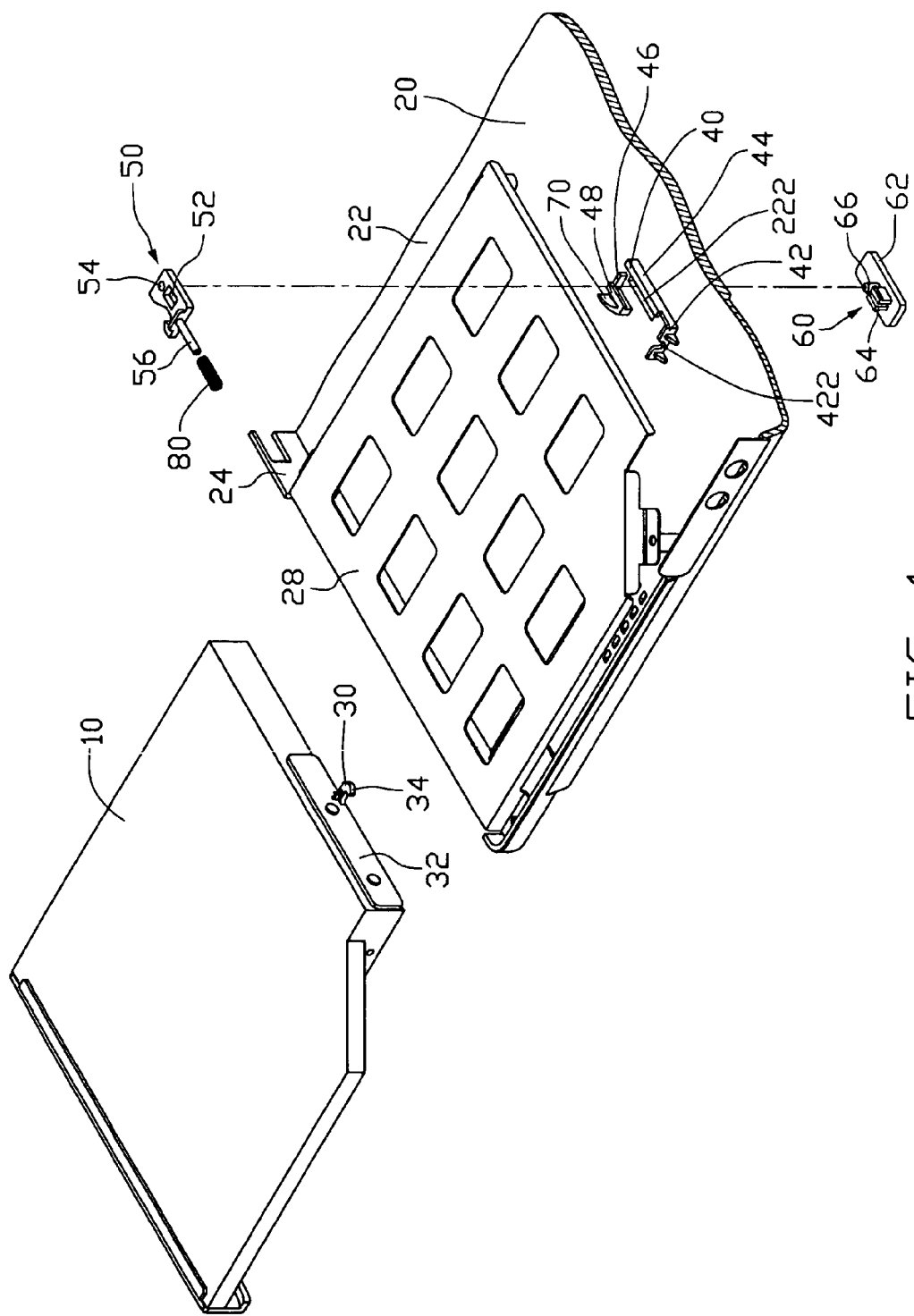
FIG. 1 is an exploded, isometric view of a mounting apparatus in accordance with the present invention, together with a data storage device and a notebook computer enclosure.
Figure 2:
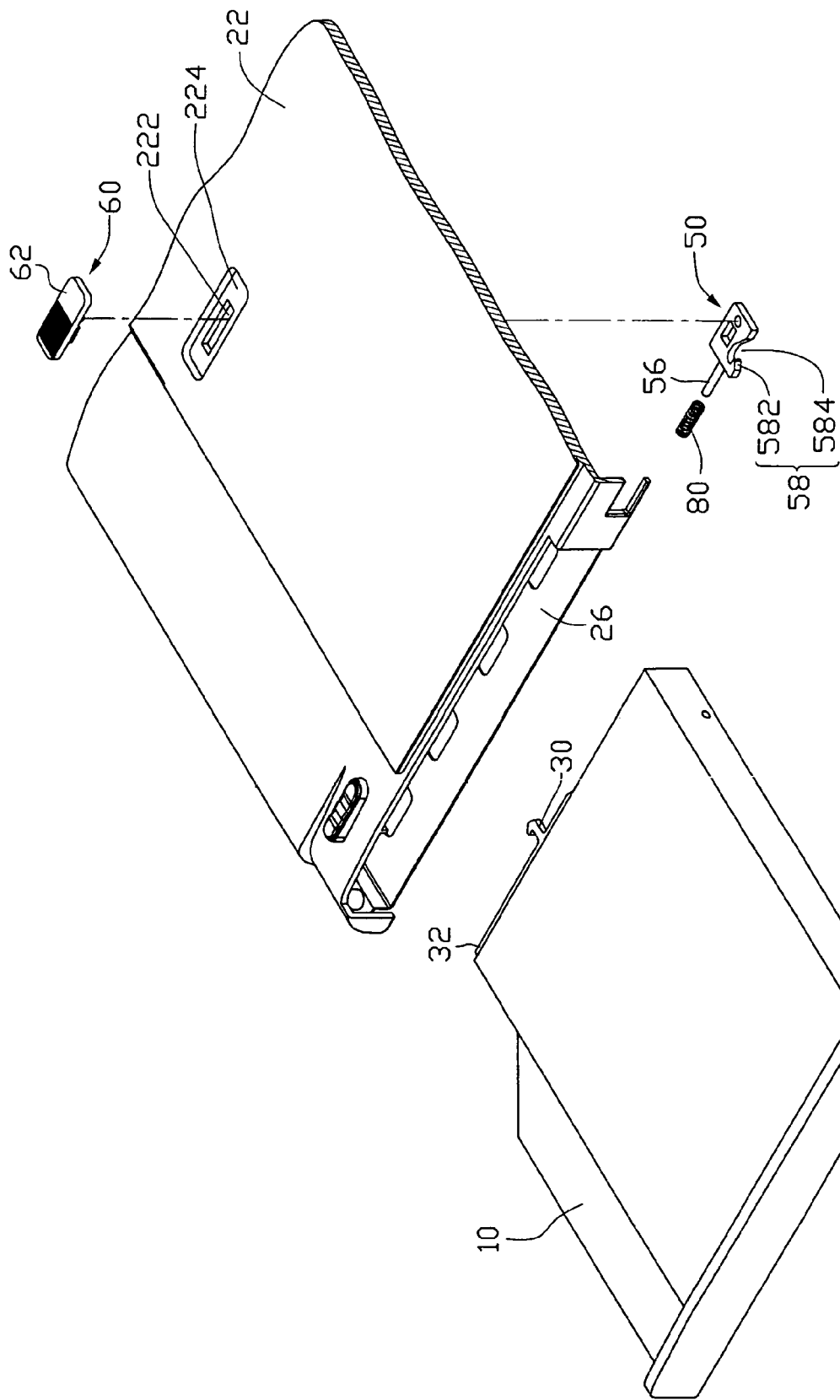
FIG. 2 is similar to FIG. 1, but viewed from another aspect.

Referring to FIGS. 1 and 2, a mounting apparatus in accordance with a preferred embodiment of the present invention is provided to attach a component like a data storage device 10 to a computer enclosure 20 of an electronic device like a notebook. The notebook computer enclosure includes a bottom panel 22 and a side panel 24. An opening 26 is defined in the side panel 24 for entry of the data storage device 10. A cover 28 is formed corresponding to the opening 26, and is parallel with the bottom panel 22. A receiving space is defined between the cover 28 and the bottom panel 22. A fixing plate 32 is mounted to a rear portion of the data storage device 10 via conventional means such as screws. A locking member 30 extends outwardly from the fixing plate 32. The locking member 30 is a hook whose bottom portion forms a chamfer 34.

The mounting apparatus includes a restricting portion 40, a movable locking portion 50, an operation portion 60, a resilient pushing portion 70, and resilient element 80.

The restricting portion 40 is integrally formed on an inner surface of the bottom panel 22 of the notebook computer enclosure 20. In another embodiment, the restricting portion 40 may be formed alone and fixed to the inner surface of the bottom panel 22 via bolts. The restricting portion 40 includes a first wall 42, a second wall 44, a third wall 46, and a fourth wall 48, the four walls corporately forming a rectangular accommodating space. A U-shaped cutout 422 is defined in the first wall 42. An elongate sliding slot 222 is defined in the bottom panel 22 inside the restricting portion 40, and a recess portion 224 is defined in the bottom panel 22 besides the sliding slot 222.

The operation portion 60 includes a manipulating section 62 forming a plurality of ridges on a back surface thereof for facilitating manual operation. A pair of clasps 64 and a positioning post 66 extend from an inner surface of the manipulating section 62.

The locking portion 50 defines a rectangular locking hole 52, and a circular through hole 54. A cylindric guiding post 56 is formed from one side of the locking portion 50. A locking section 58 is formed at the locking portion 50 corresponding to the locking member 30 of the rear portion of the data storage device 10. The locking section 58 includes a catch 582 defining a chamfer, and a receiving slot 584.

The pushing portion 70 is a spring tab extending slantwise from the fourth wall 48 of the restricting portion 40. The spring tab may be integrally formed from the fourth wall 48, or attached to the fourth wall 48 at one end thereof. The pushing portion 70 may be a spring that is fixed to the fourth wall 48.

The resilient element 80 is a coil spring in this preferred embodiment.

Figure 3:
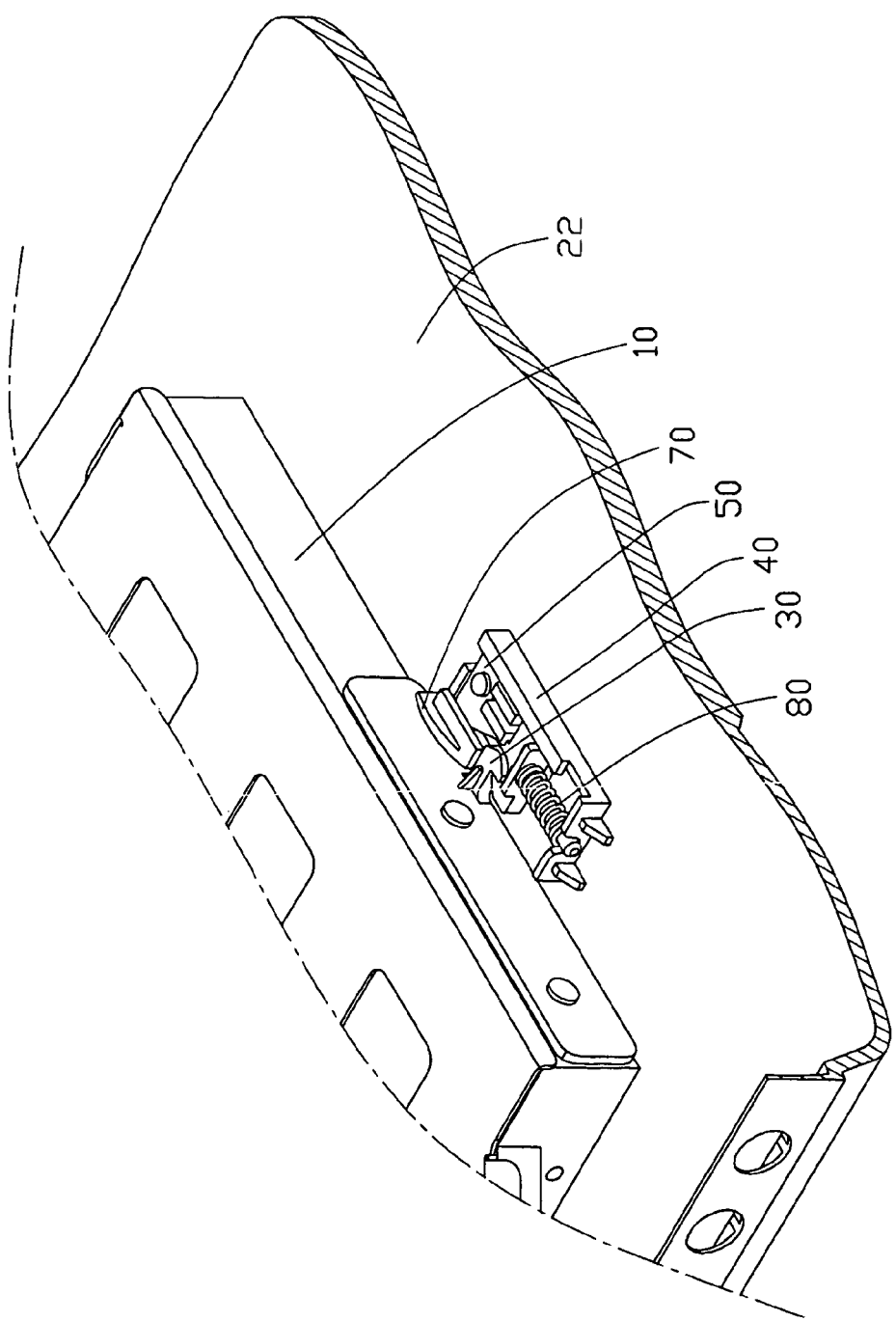
FIG. 3 is an assembled view of FIG. 1, showing a locking member at a rear portion of the data storage device engaging with a locking portion of the mounting apparatus.

Referring also to FIG. 3, in assembling the mounting apparatus, the resilient element 80 is placed around the guiding post 56 of the locking portion 50. The locking portion 50 is placed into the accommodating space of the restricting portion 40 with the guiding post 56 extending through the cutout 422 and the resilient element 80 disposed between the first wall 42 and the locking portion 50. The resilient element 80 pushes the locking portion 50 toward the third wall 46. The manipulating section 62 is accommodated in the recess portion 224. The clasps 64 extend through the sliding slot 222 and the locking hole 52, and engage with the edges of the locking hole 52. The positioning post 66 extends through the sliding slot 222 and the through hole 54. Thus, the locking portion 50 can slide with the operation portion 60 along the sliding slot 222.

In assembling the data storage device 10, the data storage device 10 is pushed into the notebook computer chassis 20 from the opening 26. The chamfer 34 of the locking member 30 pushes the chamfer of the catch 582 of the locking portion 50, thereby the locking portion 50 is driven toward the first wall 42 of the restricting portion 40, and the resilient element 80 is compressed. When the locking member 30 rides over the catch 582 and enters the receiving slot 584, the locking portion 50 is driven toward the third wall 46 by the restoring force of the resilient element 80, thus the locking member 30 engages with the catch 582. Thereby the data storage device 10 is fixed in the notebook computer enclosure 20. The pushing portion 70 is compressed between the fourth wall 48 of the restricting portion 40 and the fixing plate 32 of the rear portion of the data storage device 10 to absorb vibration.

Figure 4:
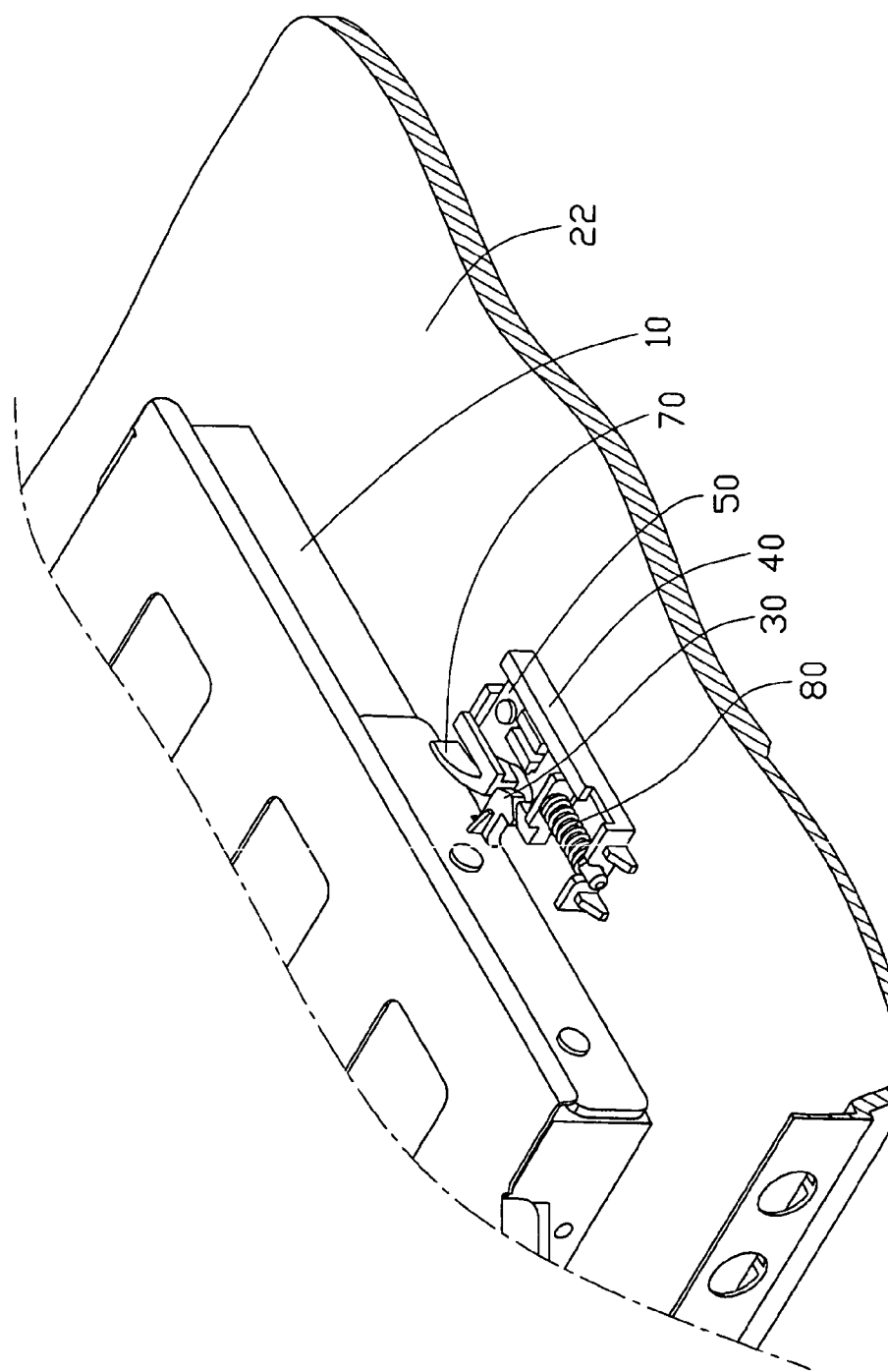
FIG. 4 is an assembled view of FIG. 1, showing a locking member at a rear portion of the data storage device disengaging from a locking portion of the mounting apparatus, and the data storage device being pushed out.

Referring also to FIG. 4, in detaching the data storage device 10, the manipulating section 62 of the operation portion 60 is pushed from a bottom of the bottom panel 22. The operation portion 60 drives the locking portion 50 to move toward the first wall 42. The resilient element 80 is compressed, the locking member 30 disengages from the locking portion 50, and the data storage device 10 is pushed out a certain distance via the restoring force of the pushing portion 70 to facilitate being taken out from the notebook computer enclosure 20.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

We claim:

1. A mounting apparatus for mounting a data storage device in a computer enclosure, the data storage device being mounted with a locking member, the mounting apparatus comprising:
   a restricting portion arranged in the computer enclosure;
   a locking portion movably disposed in the restricting portion;
   an operation portion, wherein the operation portion comprises a manipulating section exposed to an outside of the computer enclosure, and a pair of clasps engaging with the locking portion, wherein the computer enclosure defines a sliding slot in the restricting portion, a recess portion is defined in an outer side of the computer enclosure around the sliding slot, the manipulating section is disposed in the recess portion, and the clasps extend through the sliding slot to engage with the locking portion;
   a resilient element disposed between the locking portion and the restricting portion; and
   a resilient pushing portion disposed between the data storage device and the restricting portion;
   wherein the locking member drives the locking portion to deform the resilient element, and then engages with the locking portion; and
   wherein when the locking member disengages from the locking portion, the resilient pushing portion drives the data storage device outwardly.

2. The mounting apparatus as claimed in claim 1, wherein the locking portion comprises a catch having a chamfer, and a receiving slot for engagingly receiving the locking member.

3. The mounting apparatus as claimed in claim 2, wherein the locking member is a hook having a chamfer corresponding to the catch of the locking portion.

4. The mounting apparatus as claimed in claim 1, wherein the locking portion forms a guiding post at one side thereof, and the resilient element is a coil spring that is placed around the guiding post.

5. The mounting apparatus as claimed in claim 1, wherein the pushing portion is a spring tab extending slantwise from the restricting portion.

6. The mounting apparatus as claimed in claim 1, wherein the restricting portion comprises four walls corporately forming a rectangular accommodating space to accommodating the locking portion.

7. A mounting apparatus for mounting a data storage device to a computer enclosure, a locking member being mounted to the data storage device, the mounting apparatus comprising:
   a locking portion movably disposed to an inner side of the computer enclosure via a resilient element;
   a restricting portion arranged at the inner side of the computer enclosure for the locking portion slidably received therein, wherein the restricting portion is positioned at a rear side of the computer enclosure towards which the data storage device is moved into the computer enclosure in said first direction;
   a resilient pushing portion arranged between the restricting portion and the data storage device; and
   an operation portion movably disposed to an outer side of the computer enclosure and connected with the locking portion;
   wherein when the data storage device is pushed into the computer enclosure in a first direction, the locking member drives the locking portion to move in a second direction perpendicular to the first direction, and then engages with the locking portion; and
   wherein when the operation portion is moved in the second direction, the locking portion disengages from the locking member.

8. The mounting apparatus as claimed in claim 7, wherein the locking portion forms a guiding post at one side thereof, the resilient element is a coil spring that is placed around the guiding post and located between the locking portion and a wall of the restricting portion, the locking portion is slid linearly along an axis of the guiding post to compress or release the coil spring.

9. The mounting apparatus as claimed in claim 7, wherein the locking portion comprises a catch having a chamfer, and a receiving slot for engagingly receiving the locking member.

10. The mounting apparatus as claimed in claim 9, wherein the locking member is a hook having a chamfer corresponding to the chamfer of the catch of the locking portion.

11. The mounting apparatus as claimed in claim 7, wherein the computer enclosure defines a sliding slot in a restricting portion arranged at the inner side of the computer enclosure for the locking portion slidably received therein, a recess portion is defined in an outer side of the computer enclosure around the sliding slot, a manipulating section of the operation portion is disposed in the recess portion, and a pair of clasps of the operation portion extend through the sliding slot to engage with the locking portion.

12. An electronic device comprising:
   a component of said electronic device installable in a space defined inside said electronic device for functional extension thereof, and movable into and out of said space of said electronic device along a first direction;
   a generally rectangular restricting portion installed in said electronic device at a rear side of said space, so that said component is movable to said restricting portion to be totally received in said space;
   a pushing portion integrally formed from said front wall of said restricting portion so as to compressibly engage with said component for applying a pushing force to urge movement of said component alone said first direction; and
   a locking portion movably installable in said restricting portion, and reachable to said component when said component is completely installed in said space, said locking portion being restricted by a front wall and a rear wall of said restricting portion which are parallel to each other, to be movable only along a second direction perpendicular to said first direction between a first position thereof where said locking portion reachably engages with said component to secure said component in said space along said first direction, and a second position thereof where said locking portion disengages from said component to release said component.

13. The electronic device as claimed in claim 12, wherein a sliding slot is defined in said restricting portion, a recess portion is defined in an outer side of said electronic device around said sliding slot, a manipulating section of an operation portion is disposed in said recess portion, and a pair of clasps of said operation portion extend through said sliding slot to engage with said locking portion.

* * * * *